US00RE49459E

(19) United States
(12) Reissued Patent
Yun

(10) Patent Number: US RE49,459 E
(45) Date of Reissued Patent: Mar. 14, 2023

(54) APPARATUS AND METHOD FOR CONFIGURING PASSWORD AND FOR RELEASING LOCK

(71) Applicant: Samsung Electronics Co., Ltd., Gyeonggi-do (KR)

(72) Inventor: Yong-Sang Yun, Gyeonggi-do (KR)

(73) Assignee: Samsung Electronics Co., Ltd., Suwon-si (KR)

(21) Appl. No.: 16/358,216

(22) Filed: Mar. 19, 2019

Related U.S. Patent Documents

Reissue of:
(64) Patent No.: 9,600,650
Issued: Mar. 21, 2017
Appl. No.: 14/982,238
Filed: Dec. 29, 2015

U.S. Applications:
(63) Continuation of application No. 14/580,552, filed on Dec. 23, 2014, now Pat. No. 9,230,079, which is a
(Continued)

(30) Foreign Application Priority Data

Mar. 5, 2013 (KR) ..... 10-2013-0023451

(51) Int. Cl.
*G06F 21/36* (2013.01)
*G06F 3/04883* (2022.01)
(Continued)

(52) U.S. Cl.
CPC ..... *G06F 21/36* (2013.01); *G06F 3/04883* (2013.01); *G06F 21/31* (2013.01);
(Continued)

(58) Field of Classification Search
CPC ..... G06F 21/31; G06F 21/36; G06F 21/45; G06F 21/46; G06F 2221/2113; G06F 3/04883
See application file for complete search history.

(56) References Cited

U.S. PATENT DOCUMENTS 7,593,000 B1 9/2009 Chin
8,588,739 B2 11/2013 Kawabata
(Continued)

FOREIGN PATENT DOCUMENTS

CN 101980131 A 2/2011
CN 102970408 A 3/2013
(Continued)

OTHER PUBLICATIONS

Parker, et al.; "Styling Buttons and Toolbars with the jQuery UI CSS Framework"; Filament Group Inc.; Jan. 29, 2009; XP055600698; https://www.filamentgroup.com/lab/styling-buttons-and-toolbars-with-the-jquery-ui-css-framework.html.
(Continued)

*Primary Examiner* — Woo H Choi
(74) *Attorney, Agent, or Firm* — Cha & Reiter, LLC

(57) ABSTRACT

Methods of configuring a different authority for a plurality of users to use at least one application in an electronic device. User inputs are received to set passwords for respective user levels, where each user level is associated with a different authority to access applications. The passwords are registered for the respective user levels. At least one application is associated with one of the user levels.

23 Claims, 12 Drawing Sheets

Related U.S. Application Data continuation of application No. 14/044,210, filed on Oct. 2, 2013, now Pat. No. 8,943,609.

(51) Int. Cl.
*G06F 21/31* (2013.01)
*G06F 21/45* (2013.01)
*G06F 21/46* (2013.01)

(52) U.S. Cl.
CPC ..... *G06F 21/45* (2013.01); *G06F 21/46* (2013.01); *G06F 2221/2113* (2013.01)

(56) References Cited

U.S. PATENT DOCUMENTS

| | | | | |
|---|---|---|---|---|
| 8,812,994 | B2 * | 8/2014 | Seymour | G06F 3/0487 345/173 |
| 2003/0163811 | A1 | 8/2003 | Luehrs | |
| 2004/0236508 | A1 | 11/2004 | Ogasawara | |
| 2005/0097563 | A1 | 5/2005 | Bidet et al. | |
| 2007/0011461 | A1 | 1/2007 | Jeng | |
| 2007/0150842 | A1 | 6/2007 | Chaudhri et al. | |
| 2008/0263643 | A1 | 10/2008 | Jaiswal et al. | |
| 2009/0165145 | A1 | 6/2009 | Haapsaar et al. | |
| 2009/0284482 | A1 | 11/2009 | Chin | |
| 2010/0138914 | A1 | 6/2010 | Davis et al. | |
| 2010/0199100 | A1 | 8/2010 | Goertzen | |
| 2010/0306718 | A1 | 12/2010 | Shim et al. | |
| 2011/0080349 | A1 | 4/2011 | Holbein et al. | |
| 2011/0080350 | A1 | 4/2011 | Almalki et al. | |
| 2011/0088086 | A1 | 4/2011 | Swink et al. | |
| 2011/0256848 | A1 | 10/2011 | Bok et al. | |
| 2011/0294467 | A1 | 12/2011 | Kim et al. | |
| 2011/0316797 | A1 | 12/2011 | Johansson | |
| 2012/0023573 | A1 | 1/2012 | Shi | |
| 2012/0046077 | A1 | 2/2012 | Kim et al. | |
| 2012/0054057 | A1 | 3/2012 | O'Connell et al. | |
| 2012/0066650 | A1 | 3/2012 | Tirpak et al. | |
| 2012/0081282 | A1 | 4/2012 | Chin | |
| 2012/0084734 | A1 | 4/2012 | Wilairat | G06F 21/629 715/863 |
| 2012/0151400 | A1 | 6/2012 | Hong et al. | |
| 2012/0291121 | A1 | 11/2012 | Huang et al. | |
| 2012/0311499 | A1 | 12/2012 | Dellinger et al. | |
| 2013/0014250 | A1 | 1/2013 | Brown et al. | |
| 2013/0052993 | A1 | 2/2013 | Kwon et al. | |
| 2013/0093707 | A1 | 4/2013 | Park et al. | |
| 2013/0318598 | A1 | 11/2013 | Meacham | |
| 2013/0333020 | A1 | 12/2013 | Deshpande | |
| 2014/0040943 | A1 | 2/2014 | Knowles et al. | |
| 2014/0075552 | A1 | 3/2014 | Guriappa Srinivas et al. | |
| 2014/0143844 | A1 | 5/2014 | Goertzen | |
| 2014/0259152 | A1 | 9/2014 | Yun | |

FOREIGN PATENT DOCUMENTS

| | | | |
|---|---|---|---|
| EP | 1 816 580 | A1 | 8/2007 |
| EP | 2 565 809 | A2 | 3/2013 |
| KR | 10-0496954 | B1 | 6/2005 |
| KR | 10-2007-0002346 | A | 1/2007 |
| KR | 10-2009-0073864 | A | 7/2009 |
| KR | 10-2010-0134884 | A | 12/2010 |
| KR | 10-2011-0042634 | A | 4/2011 |
| KR | 10-2012-0006696 | A | 1/2012 |
| KR | 10-2014-0070307 | A | 6/2014 |
| WO | 2004/046925 | A1 | 6/2004 |
| WO | 2010/040670 | A2 | 4/2010 |
| WO | 2012/012280 | A2 | 1/2012 |

OTHER PUBLICATIONS

European Search Report dated Jul. 10, 2019.
Full-color icons vs. greyed-out icons in menus—User Experience—Stack Exchange; Dec. 8, 2011; XP055600699; https://web.archive.org/web/20111208233311/https://ux.stackexchange.com/questions/7368/full-color-icons-vs-greyed-out-icons-in-menus.
European Search Report dated Feb. 1, 2021.
European Search Report dated Aug. 17, 2022.
Chinese Search Report dated May 30, 2016.

* cited by examiner

| USER LEVEL | CATEGORY |
|---|---|
| LEVEL 1 | WEB BROWSER |
| LEVEL 2 | TELEPHONE |
| LEVEL 3 | MESSENGER, GAME, ADULT ONLY |
FIG.4A
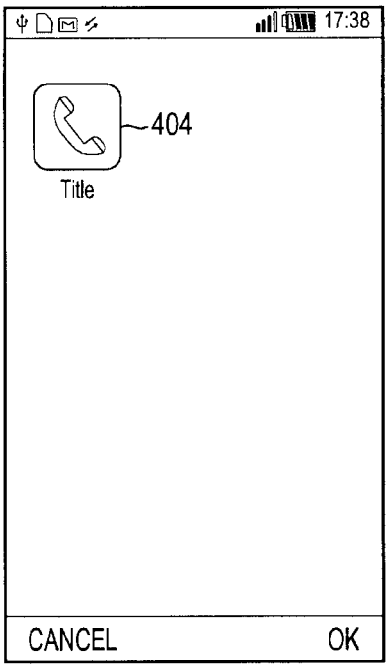
FIG.4B
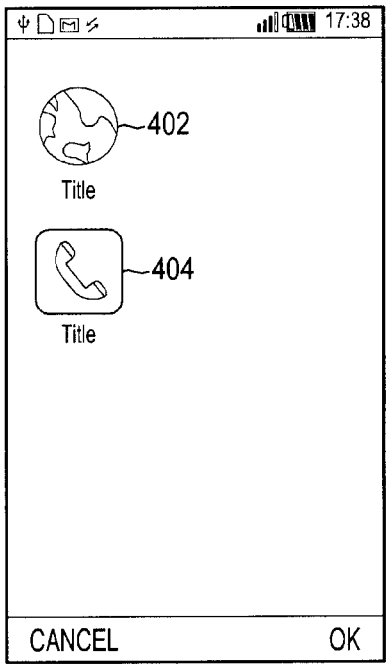
FIG.4C

APPARATUS AND METHOD FOR CONFIGURING PASSWORD AND FOR RELEASING LOCK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[The present application is a Continuation of U.S. patent application Ser. No. 14/580,552 filed on Dec. 23, 2014 which claims the benefit of the earlier U.S. patent application Ser. No. 14/044,210 filed on Oct. 2, 2013 and assigned U.S. Pat. No. 8,943,609 issued on Jan. 27, 2015 which claims the priority under 35 U.S.C. §119(a) to Korean Application Serial No. 10-2013-0023451, which was filed in the Korean Intellectual Property Office on Mar. 5, 2013, the entire content of which are hereby incorporated by reference.] *This application is a reissue application of U.S. Pat. No. 9,600,650 issued on Mar. 21, 2017 from U.S. patent application Ser. No. 14/982,238 filed on Dec. 29, 2015 which is a continuation of U.S. patent application Ser. No. 14/580, 552 filed on Dec. 23, 2014 which issued as U.S. Pat. No. 9,230,079 on Jan. 5, 2016 which claims the benefit of the U.S. patent application Ser. No. 14/044,210 filed on Oct. 2, 2013 which issued as U.S. Pat. No. 8,943,609 on Jan. 27, 2015 which claims priority under 35 U.S.C. § 119(a) to Korean Application Serial No. 10-2013-0023451, filed in the Korean Intellectual Property Office on Mar. 5, 2013, the content of each of which are hereby incorporated by reference.*

BACKGROUND

1. Technical Field

The present disclosure relates generally to configuring a password and releasing a lock using the configured password in an electronic device.

2. Description of the Related Art

With recent advances in information and communication technologies, many kinds of portable electronic devices such as smart phones and tablet PCs have proliferated. Various applications for SNS, games, photography, etc. have been implemented in a typical device.

Generally, devices such as smart phones and the like have employed a screen lock function. The term "screen lock" refers to a locked screen condition in which only predetermined information is displayed without the performance of most functions. A screen lock occurs after the passage of predetermined time following no detected user input to the device when no applications are running that normally prevent the screen lock from occurring (such as a broadcast reception application). The screen lock function restricts telephony and prevents the exposure of a user's personal information including pictures, a list of text message transmissions, and the like.

Conventionally, if a password protection is set up for the device, a method for releasing the screen lock requires the input of a predetermined password such as a pattern of numbers or touch patterns. That is, when the correct password is input, a device releases the screen lock and enables a user to use various applications which are executable in the device.

A problem arises, however, in a situation where the device is shared by multiple users. That is, when all users have authority to use all applications available in the device, personal information of each user is exposed to other users. Further, when parents and children use the device together, there is a problem in that inappropriate information might be inadvertently viewable by young children.

SUMMARY

Disclosed herein is a method for configuring authority in an electronic device to use at least one application differently for a plurality of users.

In one aspect, a method of configuring a password in an electronic device is provided. User inputs are received to set passwords for respective user levels, where each user level is associated with a different authority to access applications. The passwords are registered for the respective user levels. At least one application is associated with one of the user levels.

In another aspect, a method of releasing a lock in an electronic device is provided. The method includes: receiving an input password for releasing the lock; comparing the input password with configured passwords for a plurality of user levels associated with different authority for at least one application; and releasing the lock in consideration of a user level for the input password when the input password matches any one of the configured passwords.

Apparatus for implementing the methods are also described.

Implementations may have the advantage of preventing certain users from accessing inappropriate information and contents.

BRIEF DESCRIPTION OF THE DRAWINGS

The above and other aspects, features, and advantages of the present invention will be more apparent from the following detailed description taken in conjunction with the accompanying drawings, in which:

FIG. 4A, FIG. 4B, FIG. 4C, FIG. 4D, FIG. 4E, FIG. 4F, FIG. 4G and FIG. 4H are views illustrating an example of the method for releasing the lock according to an embodiment of the present invention;

DETAILED DESCRIPTION

Hereinafter, various embodiments of the present invention will be described with reference to the accompanying drawings. In the following description, a detailed description of known functions and configurations incorporated herein will be omitted to avoid obscuring the subject matter of the present invention.

As described above, a method for releasing a lock according to the conventional art has a disadvantage in that private information on a certain person may be exposed to others, or inappropriate contents may be obtainable by a certain person when plural users use a device.

The present invention addresses these problems by providing a scheme in which a plurality of user levels are configured in order to permit each user to access applications depending on his/her level, thereby preventing private information and inappropriate contents from being exposed to others.

An electronic device ("device") in embodiments described herein can be a portable information or communication device such as a smart phone, a tablet PC, a cell phone, an e-book, a camera, a game player, a music player, an Internet device or any other processing device with a display. The electronic device can also be a fixed device, such as a display device integrated with a home appliance.

Figure 1A:
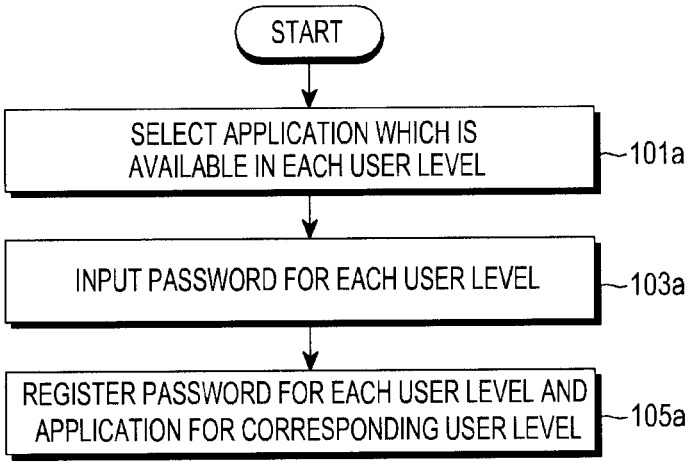
FIG. 1A is a flowchart illustrating a method for configuring a password according to embodiments of the present invention.
Figure 1B:
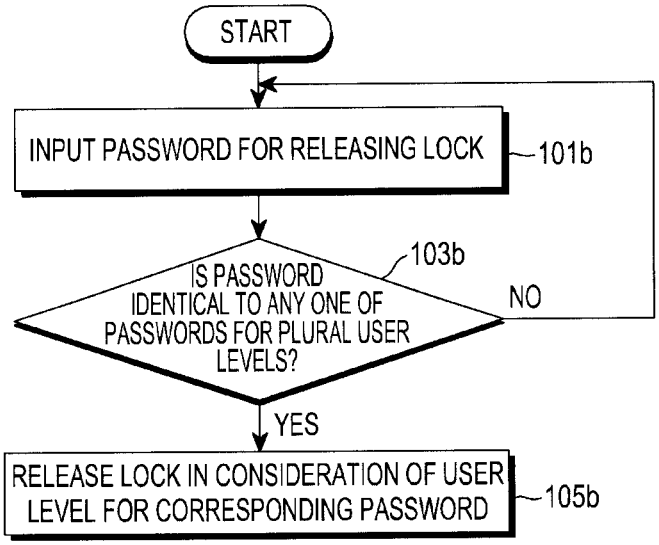
FIG. 1B is a flowchart illustrating a method for releasing a lock according to embodiments of the present invention.

FIGS. 1A and 1B are flowcharts illustrating respective methods of setting a password, and releasing a lock, according to embodiments of the present invention.

Referring to FIG. 1A, in step 101a, a device enables a user to select applications which are available in each one of multiple user levels that are predefined. Each user level is designated with a different authority to use at least one application that operates differently as a function of the operational user level. For instance, a music player application may automatically avoid playing songs that are rated for a mature listener when a current user is recognized as a low level user (e.g., a child level). Accordingly, one or more applications may be available in each user level, and may be selected for execution at various user levels.

Next, in step 103a, upon receiving different user inputs for setting passwords at each user level, the device proceeds to step 105b. In one embodiment, each password may be settable in a form of numerals or a pattern or combination of thereof.

In step 105a, the device registers the input password for each user level and the selected application for a corresponding user level. Such registered information is used when an operation of releasing a lock is executed later.

FIG. 1B is a flowchart illustrating a method, 100b, of releasing a lock according to embodiments of the present invention. In step 101b, when the device is in a locked state and a user inputs a password to release the lock, then at step 103b, the device determines whether the input password matches any of the registered passwords corresponding to one of the user levels. If the password matches, then in step 105b, the device carries out releasing the lock in consideration of the user level corresponding to the password. That is, the device releases the lock so that the user is enabled to use only the applications which are registered in the corresponding user level. In an implementation, releasing the lock can also enable a user to use all applications registered in the corresponding user level and in one or more user levels lower than the corresponding user level. In other words, the device releases the lock so that the user in a higher user level is enabled to have authority to use the applications registered in the lower user level.

Accordingly, when passwords for different user levels of a common device are registered as just described, users assigned different levels have different authority from one another in order to access applications. Therefore, there is an advantage in that inappropriate information can be blocked from being provided to a certain user.

Figure 2:
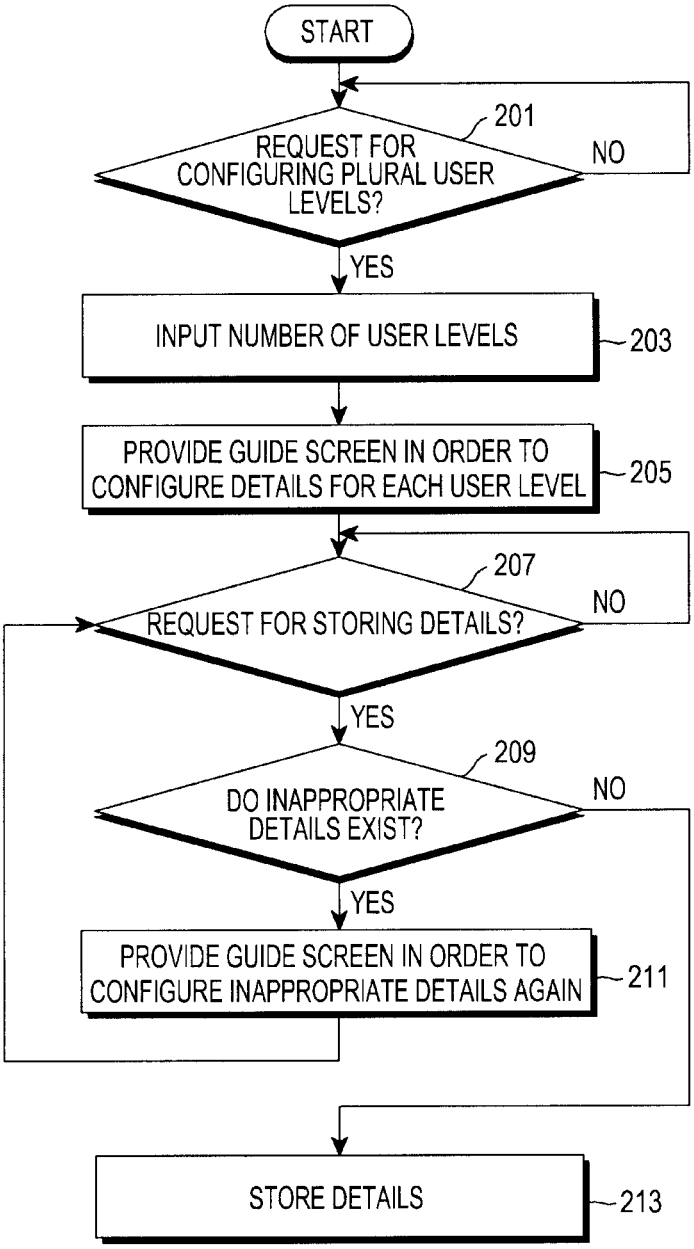
FIG. 2 is a flowchart illustrating the method for configuring the password according to an embodiment of the present invention.

FIG. 2 is a flowchart illustrating a more specific method of setting a password according to an embodiment of the present invention. In step 201, the device determines whether a user makes a request for setting a plurality of user levels. This refers to a request for setting passwords respectively corresponding to each user level, where available applications depend on each user level. The request may be selectively achieved through predesignated menus.

Figure 3A:
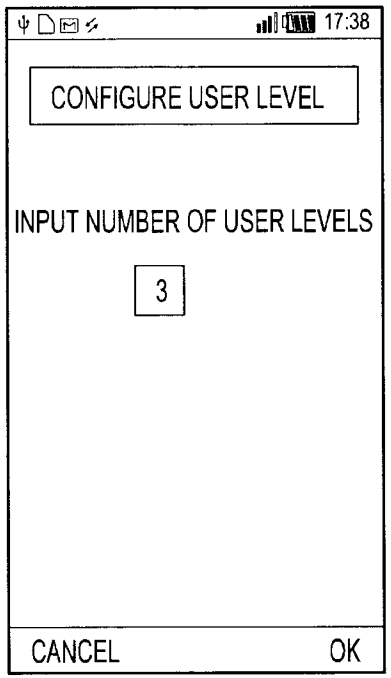
FIG. 3A, FIG. 3B, FIG. 3C, FIG. 3D, FIG. 3E, FIG. 3F, FIG. 3G, FIG. 3H and FIG. 3I are views illustrating an example of the method for configuring the password according to an embodiment of the present invention.

When the request is received, in step 203, the device receives a user input designating the number of user levels. Here, the device can provide the user with a guide screen so that the user inputs the number of the user levels. An example of the guide screen is shown in FIG. 3A.

It is noted that step 203 may be omitted according to a setting manner. For example, a device designer, a software developer, etc. can pre-set the number of the user levels as a default. In this case, the device may not prompt the user to input a number of user levels.

In step 205, the device provides the user with a guide screen so that the user sets detail specifications relating to each user level. That is, the device provides the user with the guide screen in order that the user selects available applications in each user level and sets a password relating to the corresponding user level. Examples of these screens will be described with reference to FIGS. 3B to 3D.

Figure 3B:
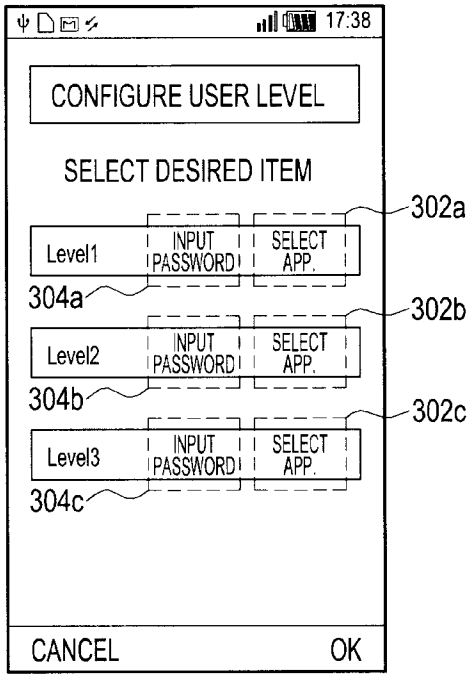
Figure 3C:
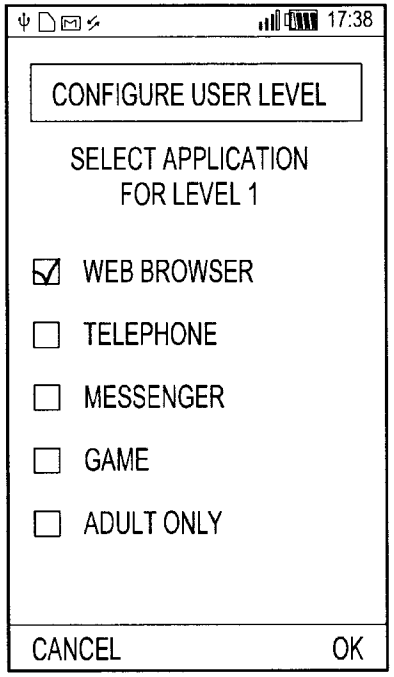
Figure 3D:
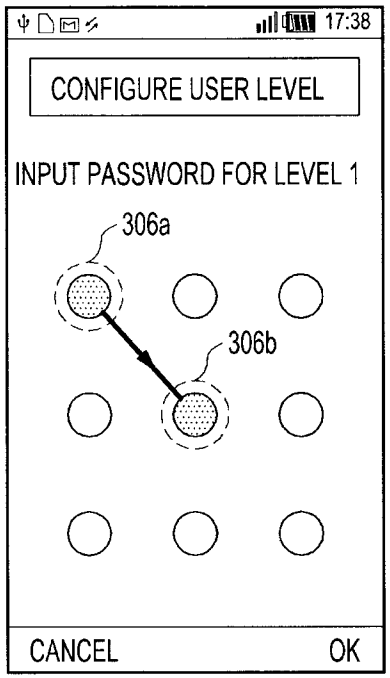

In the screen examples FIGS. 3B to 3D, the example of setting three user levels is illustrated. However, the number of the user levels can be variable according to the selection or setting of the user.

As shown in FIG. 3B, the device can provide the user with menus 302a, 302b and 302c which are used for selecting available applications in each user level, and menus 304a, 304b and 304c which are used for inputting a password corresponding to each user level.

Where the user selects a menu 302a in order to select available applications in a user level 1, the device can guide categories of applications to the user as shown in FIG. 3C. When the user selects one or more categories, the device registers the applications, which belong to the selected categories, as the available applications in the user level 1. For example, when the user selects a category of "web browser" as a category of the available application in the user level 1, the device analyzes the category of the applications stored therein and registers the applications included in "web browser" as the application to be available in the user level 1.

Figure 8:
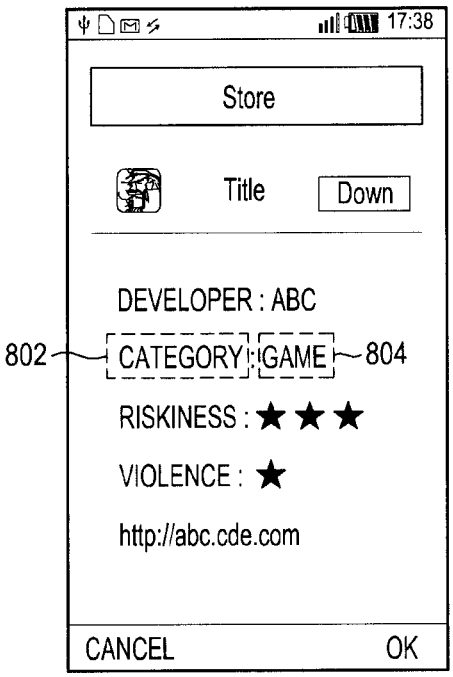
FIG. 8 is a view illustrating a process for identifying category information of the application according to an embodiment of the present invention.

Categories of the respective applications can be identified in various ways. For example, the device may analyze meta data of each application, thereby identifying a category of the corresponding application. As shown in FIG. 8, on the other hand, the device may identify the category of the corresponding application by analyzing a download page thereof or a page linked to the download page. Thus the device parses the meta data, the download page, or the like and analyzes words inserted in a certain tag, so as to identify the category of the corresponding application. For example, the device parses the meta data of each application or the download page and identifies a property value of a certain tag, so as to identify the category of the corresponding application. In a case that a category 802 in the property value of the certain tag indicates a game 804, the device determines that the category of the corresponding application is a "game". For instance, the device can request an application provider to transmit information on the category of the corresponding application to the device while transmitting a title of the application to the application provider. Then, the device may analyze information received from the application provider, and identify the category of each application.

On the other hand, when the user selects a menu 304a (see FIG. 3B) in order to set a password for the user level 1, the device provides the user with a screen as shown in FIG. 3D on which the user inputs the password. FIG. 3D shows an example of inputting the password in a pattern manner, where the user drags a touch input between different grid points. When the user inputs a pattern, which is formed by crossing two grid points 306a and 306b of plural grid points, as a password, for example, the device registers the input password as a password with respect to the user level 1. Alternatively, the device can be designed to receive a password input via numeric keys of the device. The processes described above with reference to FIGS. 3B to 3D can be executed identically when details relating to other user levels are set.

Returning to FIG. 2, in step 209, the device determines whether the user requests the device to store the details of the user levels and passwords input in the prior steps. If so, then in step 209, the device identifies whether inappropriate details are included in the details input by the user. Examples of inappropriate details are conditions where: 1) the user does not set a password for a certain user level; 2) the user does not select an application for a certain user level; 3) a password for a higher user level is lower in complexity (or security) than a lower user level; 4) passwords of different user levels are identical to one another, or 5) selected applications relating to different user levels are identical to one another. Other conditions may also be predefined.

Regarding the third condition above, i.e., the complexity criteria, this can be predefined, for example, on the basis of the number of grid points in a case of inputting a password in a pattern manner. For instance, a pattern crossing three grid points has a higher complexity than a pattern crossing two grid points. Further, in a case of inputting numerals as a password, the complexity criteria may be based on the number of numerals/characters to be input. For example, a password including three numerals has a higher complexity than a password including two numerals.

As a result of the determination of step 209, when it is determined that inappropriate details exist, the device proceeds to step 211 and provides a guide screen in order for the user to reset details relating to the corresponding user level.

Figure 3E:
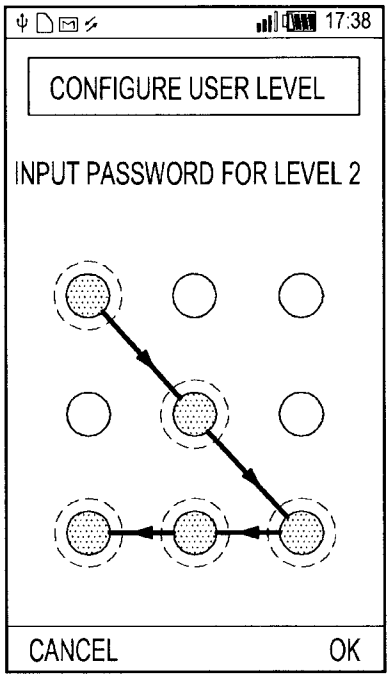
Figure 3F:
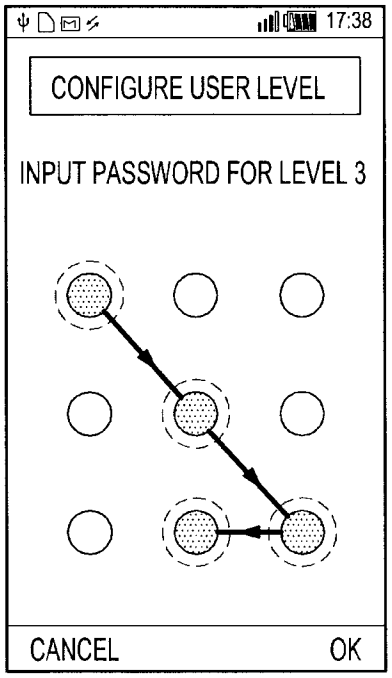
Figure 3G:
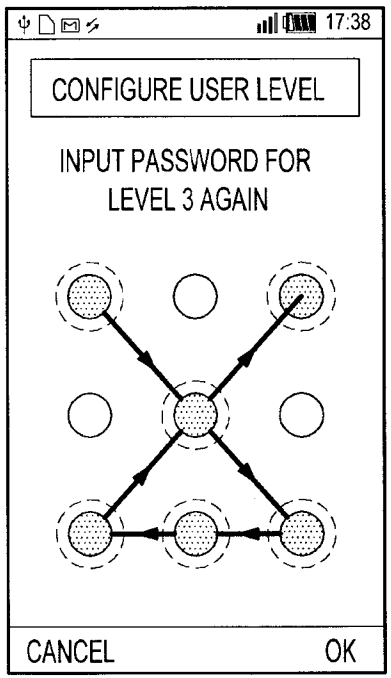

For example, as shown in FIG. 3E, it is assumed that a password relating to a user level 2 is input in a form of a pattern crossing five grid points, and a password relating to a user level 3 is input in a form of a pattern crossing four grid points as shown in FIG. 3F. In this case, since the complexity of the password for a high-rank user level (user level 3) is lower than that of a low-rank user level (user level 2) as described above, the device determines that inappropriate details exist (and may display text information explaining why) and requests the user to input a password of any user level again. FIG. 3G shows an example of a case that the device enables the user to input a password again by requesting the user to input the password for the user level 3 again.

If at step 209, the device determines that the inappropriate details do not exist, the process moves to step 213 so as to store the details input by the user.

Figure 3H:
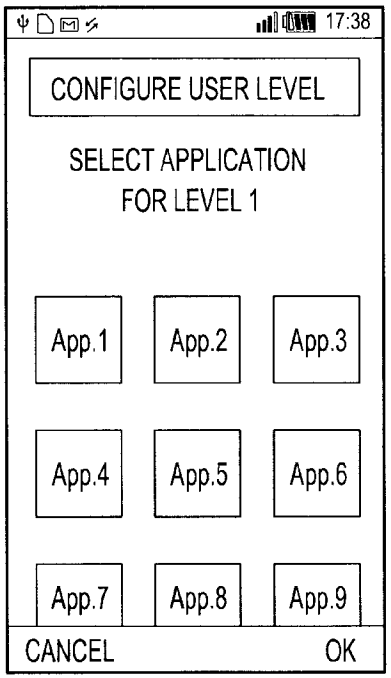

As mentioned above, the selection of one or more applications for each user level by selecting predetermined categories has been described as an example. As shown in FIG. 3H, however, certain applications may be adapted to two or more user levels. In this case, each user level may be selected from an application list stored in the device.

Figure 3I:
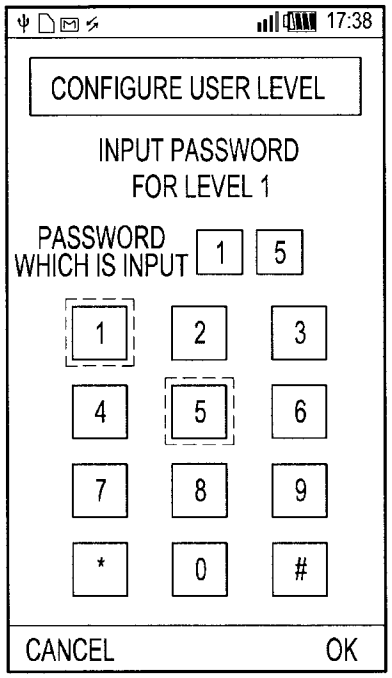

Further, the method of inputting the password using a pattern has been described above. However, a password may be input by using numerals instead of patterns as shown in FIG. 3I.

As mentioned above, a method of setting the details for each user level according to an embodiment of the present invention has been described with reference to FIGS. 2 and 3. Subsequent entry of a correct password for a corresponding user level is of course necessary for releasing a lock for that level, as described in connection with FIG. 1B. Releasing a lock in consideration of a user level for a corresponding password means that the lock may be released in order for a user to use only applications registered in a corresponding user level. For example, as shown in FIG. 4A, it is assumed that a category of "web browser" for a user level 1 is registered as a category of an available application and a category of "telephony" for a user level 2 is registered as a category of an available application. When a password for the user level 2 is input, a device can display an icon 404 as shown in FIG. 4B of the application corresponding to the category of "telephony" which is registered in the user level 2. In one implementation, icons for applications for lower rank user levels are also displayed and made available. For instance, as in FIG. 4A, a category of "web browser" and a category of "telephony" are registered for user levels 1 and 2, respectively. When a password for the user level 2 is input, then as shown in FIG. 4C, a device can display both an icon 402 of the application corresponding to the category of "web browser" registered in the user level 1 and an icon 404 of the application corresponding to the category of "telephony" registered in the user level 2.

Figure 4D:
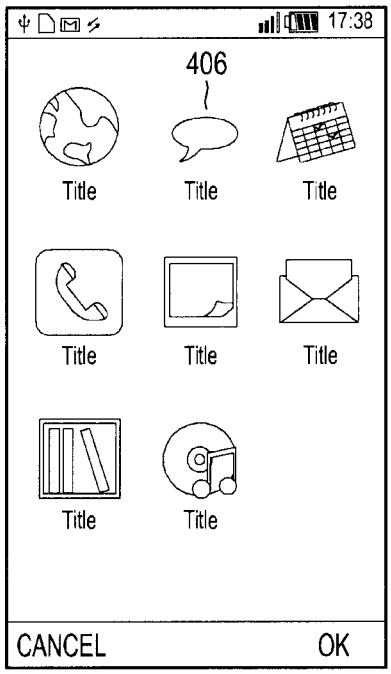
Figure 4E:
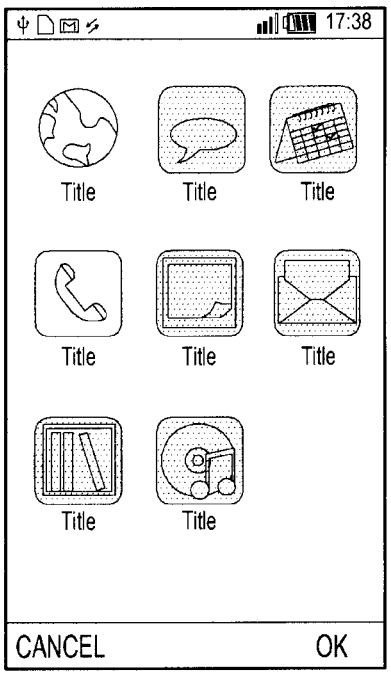

According to another embodiment of the present invention, releasing a lock in consideration of a user level for a corresponding password means that a device displays all icons of applications stored therein but only enables a user to use applications registered in the user level for a corresponding password, or applications in that user level and lower rank user levels. For example, when the input password identifies a level 2 user, the device displays all icons of the applications stored therein as shown in FIG. 4D, but does not enable the user to execute an application 406 registered for a user level 3.

According to still another implementation, releasing the lock after password entry is implemented by displaying all icons of the applications stored in the device; however, icons of the applications registered in the user level for the corresponding password are displayed in a different state from that of icons of the remaining applications. For instance, applications that are unavailable due to the current user level being too low are displayed in a distinguishing manner. Examples of this approach are illustrated in FIG.

Figure 4F:
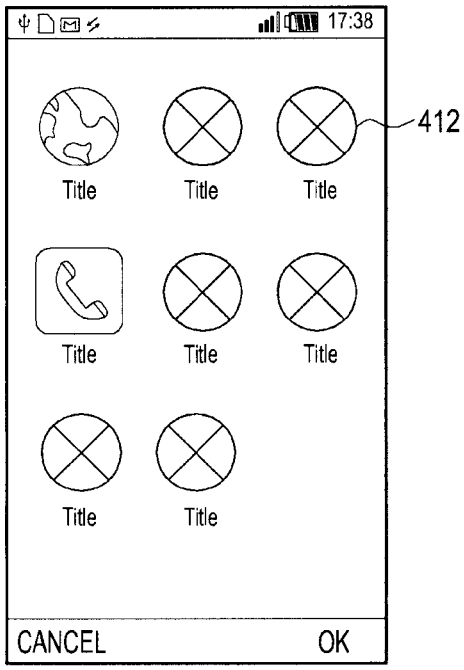
Figure 4G:
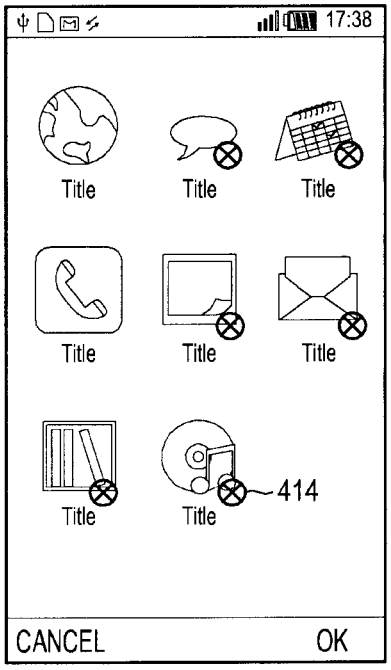

4E, in which a different opacity is used for the icons of the unavailable applications ("apps"); and in FIG. 4F, where icons of unavailable apps are replaced with predetermined images 412 and in FIG. 4G, where predetermined images 414 are superposed with the icons of the unavailable apps.

Figure 4H:
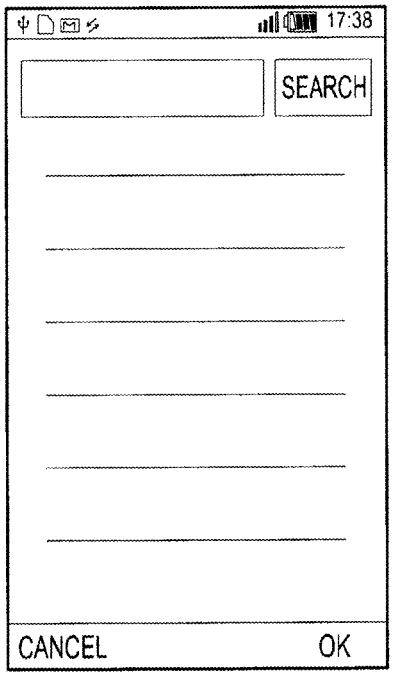

Further, in a case of only one application being registered in a user level for a corresponding password, after the correct password is entered, the application may be executed immediately. For example, when only one application, which belongs to a category of "web browser", is registered in a user level 1 and a password input by a user in order to release a lock is matched with the user level 1, a device can execute the corresponding application immediately, as shown in FIG. 4H.

Methods of releasing the lock according to embodiments of the present invention have been described with reference to FIG. 4A to 4H. User levels for each application can be subsequently changed. For example, as described above with reference to FIG. 3C, upon selecting a category of applications and an application adapted to each user level, a user can designate separately and set the respective applications to belong to respective user levels different from one another, even though the applications are included in the identical category. Hereinafter, processes of changing the user levels for each application will be described with reference to FIGS. 5-6.

Figure 5:
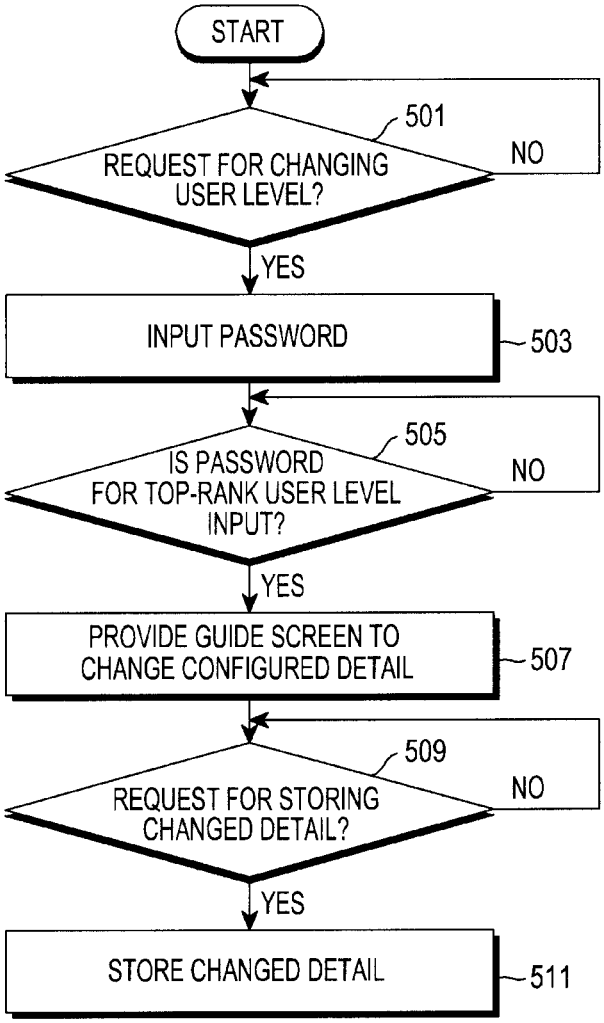
FIG. 5 is a flowchart illustrating a method for changing a user level to each application according to an embodiment of the present invention.

FIG. 5 is a flowchart illustrating an example process of changing user levels for each application according to an embodiment of the present invention.

When receiving a user request in step 501 for a change of the user levels, i.e. a request to change user levels for each application, a device proceeds to step 503 and receives a password input by the user.

The device identifies whether the password input by the user is matched with a top-rank user level in step 505. If not, user levels are not changeable and the device remains in a waiting mode for the correct top-rank password (indicated by flow line back to 505 query). If the input password is matched with the top-rank user level, the device proceeds to step 507 where the device enables the user, who belongs to the top-rank user level, to change the user level for each application.

Figure 6A:
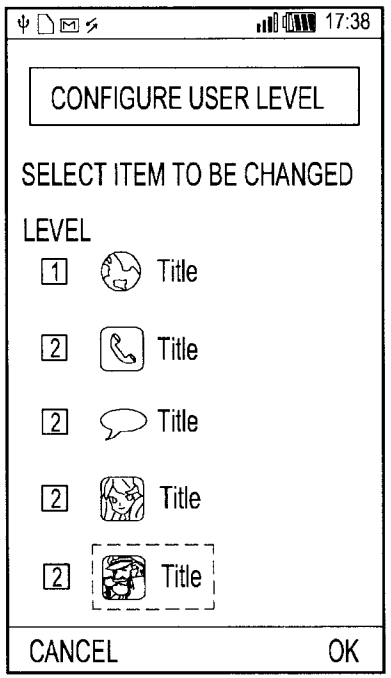
FIG. 6A, FIG. 6B, FIG. 6C and FIG. 6D are views illustrating a method for changing a user level to each application according to an embodiment of the present invention.
Figure 6B:
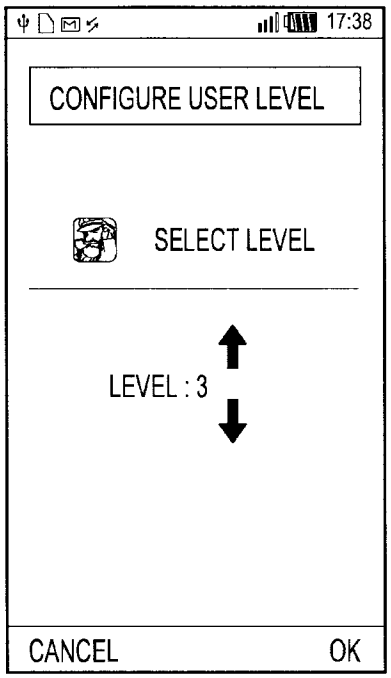
Figure 6C:
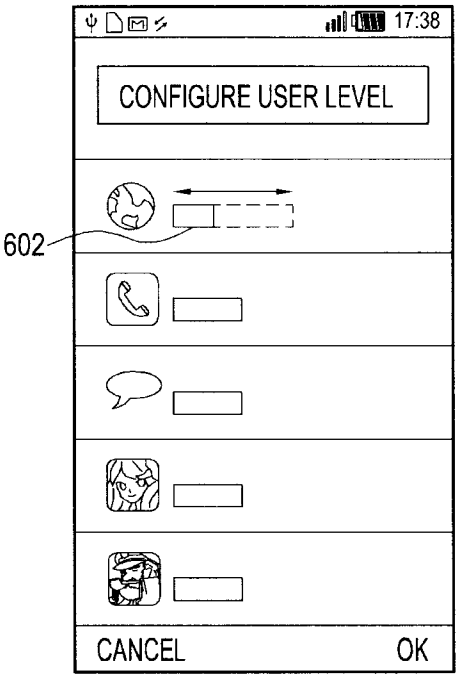

The device provides a guide screen so that the user can change the user level for each application, in step 507. For example, the device can display a list of the applications registered in each user level, as shown in FIG. 6A. Accordingly, the user may select any one of the applications and change the user level for the corresponding application, as shown in FIG. 6B. According to embodiments of the present invention, the device can display a level of each application in a form of an image 602 (see FIG. 6C), and the user can change the user level for each application by swiping the corresponding image 602 (e.g., lengthening the level indicator, as indicated by the arrowed line). Where the user level for any one of the applications is changed from a user level 2 to a user level 3 as shown in FIGS. 6A to 6C, the device registers the corresponding application as an application to be available in the user level 3.

Once the user is satisfied with the user level changes, the user can request that the changes be stored via suitable input command in step 509, whereupon the device finally stores the changes in step 511.

An embodiment in which only the user belonging to the top-rank user level changes the user level for each application, has been described with reference to FIG. 5. In an alternative embodiment, users who do not belong to the top-rank user level are permitted to change the user level for each application.

The embodiment of changing the user level for each application has been described with reference to FIG. 5. The technique of this embodiment can be identically applied to a case of changing the available applications for each user level, or a case of changing the password for each user level. That is, when the device receives a request from the user, the device can provide a guide screen so that a user changes details for each user level, for example passwords and available applications, through the guide screen, as shown in FIG. 6D.

Figure 6D:
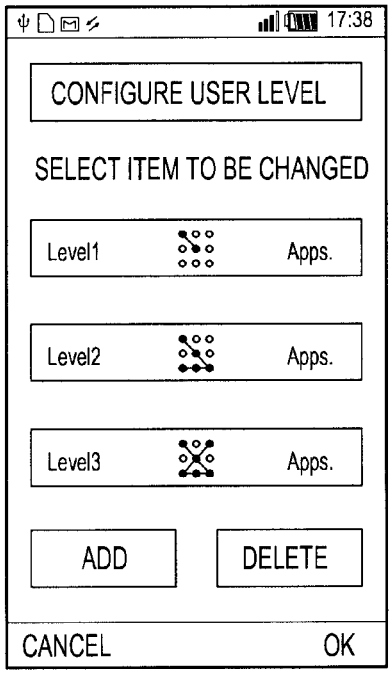

Referring to FIG. 6D, the device provides a menu so that the user adds or deletes a user level through the menu. In an embodiment, when any user level is deleted, the device can register applications, which are included in the user level to be deleted, in the lowest rank user level among higher user levels than that of the deleted user level. For example, when a user level 1 is deleted, the applications included in a user level 1 can be registered in a user level 2 which is the lowest rank user level of a user level 2 and a user level 3 which are higher level than the user level 1. According to this embodiment, in a state that the user levels 1 to 3 are set, when the user level 1 is deleted, the user level 2 may be changed into the user level 1, and the user level 3 may be changed into the user level 2.

Methods of changing various details related to the user level according to embodiments have been described with reference to FIGS. 5 and 6. After the user levels are set and a new application is to be downloaded, it is desirable to automatically set a user level for the new application. Hereinafter, processes of automatically setting user levels for a downloaded application will be described.

Figure 7:
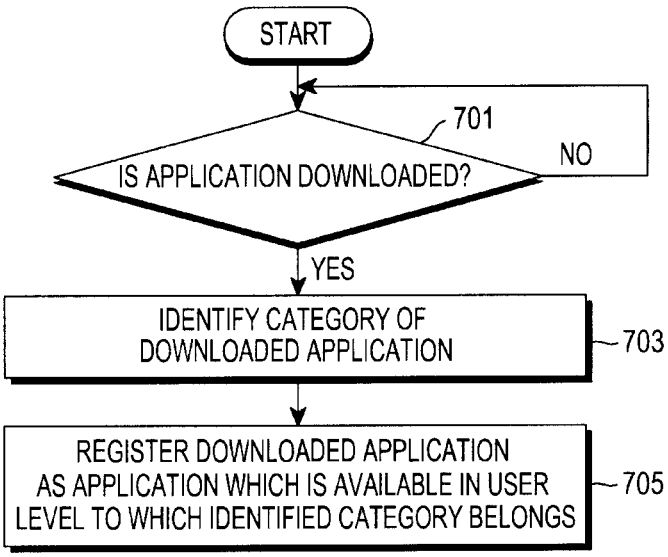
FIG. 7 is a flowchart illustrating processes for automatically configuring a user level to a downloaded application according to an embodiment of the present invention.

FIG. 7 is a flowchart illustrating an example process of automatically setting user levels for a new downloaded application ("app") according to an embodiment of the present invention. In the embodiment to be described with reference to FIG. 7, it is assumed that a selection of an app for each user level can be achieved by selecting a category of the app as described with reference to FIG. 3C.

A device identifies whether an app is downloaded in step 701. If so, the device identifies a category of the downloaded app in step 703. Here, the category of the downloaded app can be identified in different ways. For example, the device analyzes meta data of the downloaded app, so as to identify the app's category. In another approach, as shown in FIG. 8, the device can analyze a page linked to a download page of the corresponding app so as to identify the app's category. That is, the device can parse the meta data, the download page, or the like and analyze words inserted in a certain tag, so as to identify the app's category. For example, the device can parse the meta data or the download page of the downloaded app and analyze a property value of the certain tag to identify the app's category. If the property value of the certain tag is category 802 and game 804, the device determines that the app's category is "game". In another example, the device transmits information of the app, for example the app's title, to an application provider, while requesting the application provider to transmit category information for the corresponding app to the device. Then, the device may analyze information received from the application provider to identify the app's category.

Returning to FIG. 7, the device registers the downloaded app as an available application in a user level which includes the identified category.

The methods of setting passwords for plural user levels respectively and of releasing a lock have been described with reference to FIGS. 1 to 8. Hereinafter, the configuration of a device to which the embodiments of the present invention are applied will be described with reference to FIG. 9.

Figure 9:
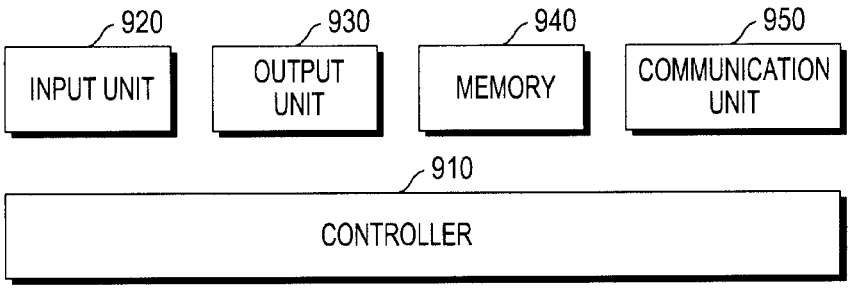
FIG. 9 is a block diagram illustrating an electronic device to which embodiments of the present invention can be applied.

FIG. 9 is a block diagram illustrating an electronic device to which embodiments of the present invention can be applied. Device conveniently performs both functions of a device for setting a password and a device for releasing a lock. It should be noted, at least one of structural elements according to the embodiment shown in FIG. 9 may be omitted.

Device includes a controller 910, an input unit 920, an output unit 930, a memory 940 and a communication unit 950.

Controller 910 controls the various operations described above in connection with FIGS. 1-8. Thus, at the time of setting a password, the controller 910 enables a user to select one or more applications to be used in each user level through the input unit 920 with relation to a plurality of user levels respectively having an authority to use one or more applications, and receives a password to be used for releasing a lock in each user level through the input unit 920. At this time, the controller 910 enables a user to select at least one category among the plural categories set for an application. As a result, the user can select at least one application to be used in each user level. Further, the controller 910 enables the user to individually select at least one application to be used in each user level from a list of the applications stored in the memory 940.

Controller 910 registers the input password for each user level and the selected application for the corresponding user level. In order to register the password and the application, the controller 910 can display a guide screen on the output unit 930 for the user to select and input the details for each user level, i.e. the password and the application.

Before the controller 910 enables the user to select at least one application to be used in each user level, on the other hand, it receives the number of the user levels through the input unit 920. Accordingly, the controller 910 displays the guide screen on the output unit 930 in order for the user to select the number of the user levels.

In cases that the complexity of the input password for any one user level is lower than that of a password for a low-rank user level, the complexity of the input password for any one user level is higher than that of a password for a high-rank user level, and the complexity of the input password for any one user level is identical to that of a password for another user level, the controller 910 receives a password for the corresponding user level input by the user again. Accordingly, the controller 910 displays the guide screen on the output 930 in order for the user to input a password for the corresponding user level again.

When at least one application is downloaded, the controller 910 identifies a category of the downloaded application and registers the downloaded application as an application to be used in a user level to which the identified category belongs. At this time, the controller 910 analyzes at least one of meta data and the download page of the corresponding application and a page linked to the download page of the corresponding application and identifies the category of the downloaded application.

Upon receiving a request for user level change of at least one application, the controller 910 registers the corresponding application as an application to be used in the user level which is requested to be changed. Accordingly, the controller 910 displays a guide screen on the output unit 930 in order for the user to change a user level for each application.

Upon receiving a request for deletion of one user level, the controller 910 registers the application registered in the corresponding user level as an application to be used in the lowest-rank user level among high-rank user levels of the user level which is requested to be deleted. Accordingly, the controller 910 displays a guide screen on the output unit 930 in order for the user to delete or add a user level.

In releasing a lock, the controller 910 receives a password to release the lock through the input unit 920, and compares the input password and the passwords stored in the memory 940. Then, the controller 910 releases the lock in consideration of a user level for the corresponding password where the input password is identical to any one of the stored passwords.

In releasing the lock, the controller 910 can command the displaying of icons of applications to be used in the user level corresponding to the input password on the output unit 930. Icons of applications to be unavailable in the corresponding user level can be displayed in a different state from the icons of the applications to be used in the corresponding user level. For example, the controller 910 commands the displaying of the icons of the applications to be unavailable in the corresponding user level in the different state from the icons of the applications to be used in the corresponding user level in any one manner of applying different opacities to the icons of the applications to be used in the corresponding user level and the icons of the applications to be unavailable in the corresponding user level, changing the icons of the unavailable applications to a predetermined image, and superposing the predetermined image over the icons of the unavailable applications.

Further, the controller 910 may not display the icons of the applications to be unavailable in the corresponding user level.

On the other hand, where only one application is available in the user level corresponding to the password input by the user, the controller 910 may carry out an application immediately.

The input unit 920 transmits information input by the user to the controller 910.

The output unit 930 displays various guide screens under the control of the controller 910.

The input unit 920 and the output unit 930 preferably include a touch screen.

The memory 940 stores details for each user level.

The communication unit 950 communicates with external devices, preferably with the capability of using different communication mechanisms.

It will be appreciated that embodiments of the present invention may be implemented in the form of hardware, software, or a combination of hardware and software. Where the embodiment of the present invention may be implemented in a software, the software can be executed by one or more processors using various operating systems or platforms. In addition, the software can be programmed by using any one of a variety of suitable programming languages, and also can be compiled into assembly codes or intermediate codes which can be carried out in a framework or a virtual machine.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of operation in an electronic device, the method comprising:

in a second mode of the electronic device *after receiving an input on a screen for increasing the number of levels, wherein the second mode is associated with a highest user level*:

(i) displaying a first screen for setting a pattern password on a touch screen of the electronic device*, wherein the pattern password is associated with a user level lower than the highest user level*;

(ii) setting a first pattern password corresponding to a first mode through the first screen, wherein the first pattern password is a password for entering the first mode from a lock state of the electronic device;

(iii) displaying a second screen for displaying representations corresponding to a plurality of applications stored in the electronic device, for setting a plurality of applications executable in the first mode among the plurality of applications; and (iv) setting a plurality of first applications selected via a user input from among the plurality of applications stored in the electronic device through the second screen, as the plurality of applications executable in the first mode;

displaying a third screen for inputting a pattern password on the touch screen, in the lock state;

determining whether a pattern password entered by a user through the third screen corresponds to the first pattern password among a plurality of pattern passwords stored in the electronic device;

releasing the lock state and entering the first mode, if the pattern password entered in the lock state corresponds to the first pattern password; and upon entering the first mode, displaying a plurality of icons for executing applications corresponding to the plurality of first applications on the touch screen *and displaying at least one image indicating a restriction of usage corresponding to at least one application from among the plurality of applications in response to entering the first mode*; *and* wherein said (iv) setting the plurality of first applications is disabled in the first mode.

2. The method of claim 1, further comprising:

setting a second pattern password corresponding to the second mode through the first screen, wherein the second pattern password is a password for entering the second mode from the lock state;

determining whether a pattern password entered by the user through the third screen corresponds to the second pattern password among the plurality of pattern passwords stored in the electronic device;

releasing the lock state and entering the second mode, if the pattern password entered in the lock [screen] state corresponds to the second pattern password; and upon entering the second mode, displaying both the plurality of icons for executing applications corresponding to the plurality of first applications and at least one further icon for executing at least one application that is not selected via the user input as the plurality of applications executable in the first mode, on the touch screen.

3. The method of claim 1, wherein the first pattern password is a password that passes at least two grid points among a plurality of grid points.

4. The method of claim 1, wherein the selection of the plurality of first applications is made via a selection of two or more icons corresponding to two or more respective applications.

5. The method of claim 1, wherein an application that is not selected by the user input as the plurality of first applications executable in the first mode is not executable in the first mode.

6. The method of claim 1, wherein an entry of the pattern password is made by a touch of the user on the third screen displayed on a touch screen.

7. The method of claim 2, wherein a selection function for the plurality of applications for the first mode is enabled in the second mode.

8. An electronic device comprising:

a touch screen;

[a memory configured to store a plurality of applications and a plurality of pattern passwords; and]

a processor [configured to control operations of:]*; and*

*a memory configured to store a plurality of applications and a plurality of pattern passwords and a plurality of executable instructions, wherein execution of the plurality of executable instructions by the processor causes performance of a plurality of operations comprising:* in a second mode of the electronic device *after receiving an input on a screen for increasing a number of levels, wherein the second mode is associated with a highest user level*:

(i) displaying a first screen for setting a pattern password on the touch screen;

(ii) setting a first pattern password corresponding to a first mode through the first screen, wherein the first pattern password is a password for entering the first mode from a lock state of the electronic device*, wherein the first pattern password is associated with a user level lower than the highest user level*;

(iii) displaying a second screen for displaying representations corresponding to the plurality of applications stored in the memory, for setting a plurality of applications executable in the first mode among the plurality of applications; and iv) setting a plurality of first applications selected by a user input from among the plurality of applications stored in the memory through the second screen, as the plurality of applications executable in the first mode;

displaying a third screen for inputting a pattern password on the touch screen in the lock state;

determining whether a pattern password entered by a user through the third screen corresponds to the first pattern password among a plurality of pattern passwords stored in the memory;

releasing the lock state and entering the first mode, if the pattern password entered in the lock state corresponds to the first pattern password; and displaying a plurality of icons for executing applications corresponding to the plurality of first applications on the touch screen *and displaying at least one image indicating a restriction of usage superposed with another at least one icon*, upon entering the first mode;

wherein said (iv) setting the plurality of first applications is disabled in the first mode.

9. The electronic device of claim 8, wherein the [processor is further configured to] *plurality of operations further comprises:* set a second pattern password corresponding to the second mode through the first screen, wherein the second pattern password is a password for entering the second mode from the lock state;

determine whether a pattern password entered by the user through the third screen corresponds to the second pattern password among the plurality of pattern passwords stored in the memory;

release the lock state and entering the second mode, if the pattern password entered in the lock [screen] state corresponds to the second pattern password; and control displaying both the plurality of icons for executing applications corresponding to the plurality of first applications and at least one further icon for executing at least one application that is not selected via the user input as the plurality of applications executable in the first mode on the touch screen, upon entering the second mode.

10. The electronic device of claim 8, wherein the representations comprises at least one of icon, test or image corresponding to the plurality of applications stored in the memory.

11. The electronic device of claim 9, wherein the first pattern password or the second pattern password is a pattern password that passes at least two grid points among a plurality of grid points.

12. The electronic device of claim 8, wherein the selection of the plurality of first applications is made via a selection of two or more icons corresponding to tow or more respective applications.

13. The electronic device of claim 8, wherein [the processor controls] *the plurality of operations further comprises controlling* the touch screen so as not to display an application that is not selected by the user input as the plurality of applications for the first mode, in the first mode.

14. The electronic device of claim 8, wherein the [processor disables] *plurality of operations further comprise disabling* a selection function for the plurality of application for the first mode in the first mode.

15. The electronic device of claim 8, wherein an entry of the pattern password is made by a touch of the user on the third screen displayed on the touch screen.

16. The electronic device of claim 9, wherein the [processor enables] *plurality of operations further comprise enabling* a selection function for an application for the first mode in the second mode.

17. The electronic device of claim 8, wherein the [processor disables] *plurality of operations further comprise disabling* a setting function for setting the plurality of the first applications as the plurality of applications for the first mode, in the first mode.

[18. The electronic device of claim 9, wherein an authority of the second mode is higher than for the first mode.]

19. The electronic device of claim 8, wherein, among the plurality of applications, unselected applications for the first mode are non-executable in the first mode.

20. An electronic device comprising:

a touch screen;

[a memory configured to store a plurality of applications and a plurality of pattern passwords; and]

a processor [configured to control operations of:]*; and*

*memory configured to store a plurality of applications and a plurality of pattern passwords, and storing a plurality of executable instructions, wherein execution of the plurality of instructions causes performance of a plurality of operations comprising:* in a second mode of the electronic device *after receiving an input on a screen for increasing a number of levels, wherein the second mode is associated with a highest user level*:

(i) displaying a first screen for setting a pattern password on the touch screen;

(ii) setting a first pattern password corresponding to a first mode through the first screen, wherein the first pattern password is a password for entering the first mode from a lock state of the electronic device*, wherein the first pattern is associated with a user level lower than the highest user level*;

(iii) displaying a second screen for displaying representations corresponding to the plurality of applications stored in the memory, for setting a plurality of applications executable in the first mode among the plurality of applications; and (iv) setting a plurality of first applications selected by a user input from among the plurality of applications stored in the memory through the second screen, as the plurality of applications executable in the first mode;

displaying a third screen for inputting a pattern password on the touch screen in the lock state;

determining whether a pattern password entered by a user through the third screen corresponds to the first pattern password among a plurality of pattern passwords stored in the memory;

releasing the lock state and entering the first mode, if the pattern password entered in the lock state corresponds to the first pattern password; and displaying a plurality of icons for executing applications corresponding to the plurality of first applications on the touch screen *and displaying at least one image indicating a restriction of usage superposed with another at least one icon*, upon entering the first mode;

wherein said (ii) setting the first pattern password corresponding to the first mode is disabled in the first mode.

*21. An electronic device comprising:*

*a touchscreen;*

*a processor; and*

*a memory storing a plurality of executable instructions, wherein execution of the instructions by the processor causes performance of a plurality of operations comprising:*

*in a first mode of the electronic device:*

*controlling to display a first screen for inputting a password on the touchscreen;*

*determining whether a pattern password entered by a user through the first screen corresponds to a first pattern password corresponding to a second mode; and*

*entering the second mode, if the pattern password entered by the user through the first screen corresponds to the first pattern password,*

*in the second mode of the electronic device after receiving an input on a screen for increasing the number of levels, wherein the second mode is associated with a highest user level:*

*(i) controlling to display a second screen for setting a pattern password on the touchscreen of the electronic device;*

*(ii) changing the first pattern password corresponding to the second mode through the second screen, wherein the first pattern password is a pattern password for entering the second mode;*

*(iii) controlling to display a third screen for displaying representations corresponding to a plurality of applications stored in the memory, for setting a plurality of applications executable in a user level lower than the highest level among the plurality of applications; and*

*(iv) setting a plurality of first applications selected via a user input from among the plurality of applications stored in the memory through the third screen, as a plurality of applications executable in the user level lower than the highest user level;*

*wherein the third screen for setting the plurality of first applications is inaccessible in the first mode; and*

*wherein the memory stores at least one other pattern password associated with the user level lower than the highest user level.*

*22. The electronic device of claim 21, wherein the plurality of operations further comprises:*

*controlling to display a fourth screen for inputting a password on the touchscreen, in a lock state;*

*determining whether a pattern password entered by a user through the fourth screen corresponds to the first password corresponding to the second mode;*

*releasing the lock state and enter the second mode, if the pattern password entered in the lock state corresponds to the first password; and*

*upon entering the second mode, controlling to display, on the touch screen, a plurality of icons for executing applications corresponding to the plurality of applications stored in the memory.*

*23. The electronic device of claim 21, wherein the plurality of first applications is executable in the highest user level.*

*24. The electronic device of claim 21, wherein the plurality of operations comprises:*

*in the second mode of the electronic device:*

*(v) setting a plurality of second applications among the plurality of applications in an intermediate user level that is higher than the user level and lower than the highest user level, wherein the plurality of first applications and the plurality of second applications are executable at the intermediate user level, and wherein the plurality of second applications is not accessible at the user level.*

* * * * *